Sept. 20, 1932.    C. E. MAYNARD    1,878,505
FLUID PRESSURE CONNECTION
Filed Feb. 25, 1929
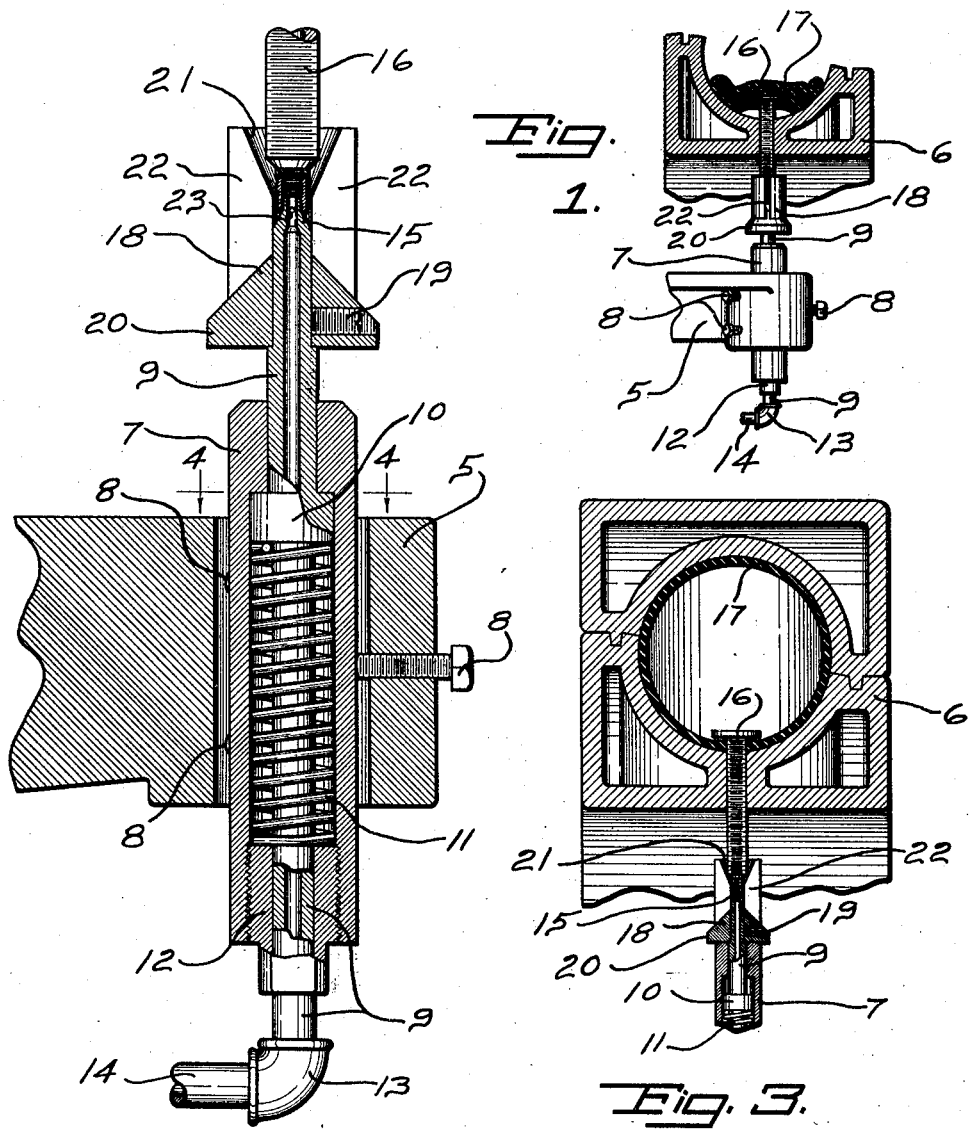
INVENTOR.
Charles Edgar Maynard.
BY
ATTORNEY.

Patented Sept. 20, 1932

1,878,505

UNITED STATES PATENT OFFICE

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

FLUID PRESSURE CONNECTION

Application filed February 25, 1929. Serial No. 342,377.

My invention relates to fluid pressure connections, such as are used in the vulcanization of inner tubes for pneumatic tires and the like. More particularly, it relates to improvements in the connections disclosed and claimed in my co-pending applications, Serial Numbers 290,500 and 307,853, filed respectively July 21, 1928 and October 2, 1928.

It has among its objects the provision of a connection which will be self-cleaning and which will also prevent any leakage of escaping fluid from contacting with the article, mold, etc. Another object is to provide a connection which will positively limit the downward movement of the valve stem so as to prevent its flange from making effective contact with the inner tube during vulcanization. Other and further objects will be apparent from the following specification and claims.

In the drawing illustrating one embodiment of my invention,

Fig. 1 is a view, partly in section showing the connection in assembled relation with the valve stem of an inner tube;

Fig. 2 is a view similar to Fig. 1, but on a larger scale, showing the position of the parts of the connection in respect to the valve stem of an uninflated tube in a mold;

Fig. 3 is a sectional view similar to Fig. 1 but on a larger scale, showing the position of parts when the tube is inflated; and Fig. 4 is a sectional view taken on line 4—4 of Fig. 2.

In the drawing, 5 represents a bracket which may be attached to the support (not shown in the drawing) of the inner section of a tube mold 6. As shown in Figs. 1 and 2 a casing 7 is adjustably positioned in the bracket 5 by adjusting screws 8. Slidably positioned in the casing 7 is a cored plunger 9 on which is formed a collar 10 engaging, as shown in Fig. 1, a compression spring 11, the compression of which may be controlled by a collar 12 threaded in the casing 7. A pipe elbow 13 serves to connect the plunger 9 to a fluid pressure supply line 14. The other end of the plunger 9 is so formed as at 15, to engage the valve stem 16 of an inner tube 17. As shown best in Fig. 1, a collar 18 is attached to the plunger 9 by a set screw 19 and its base diameter as at 20 is greater than that of the casing 7. The collar 18 is formed with a conical flare 21 and radial slots 22.

The operation of the connection is as follows: An uninflated raw tube 17 is placed in the mold 6 and the valve stem 16 is brought into engagement with the tapered end 15 of plunger 9, the conical flare 21 in the collar 18 serving to guide the valve stem. As soon as the fluid under pressure is introduced from the supply line 14 the tube is inflated in the mold (Fig. 3) and the pressure acting on the flange of the valve stem 16 overcomes the resistance of spring 11 and the plunger 9 and collar 18 move downward until the collar 18 strikes the casing 7. As shown in Fig. 3, the casing 7 is so positioned that the flange of the valve stem does not come into effective contact with the inner tube, the necessary spacing being somewhat exaggerated in the drawing in the interest of clearness. The internal pressure serves to compress the rubber about the stem effecting a seal. If any fluid escapes at the seating of the valve stem 16 with plunger 9 it is conducted away through the radial slots 22 to the edge of the collar at 20 and as the diameter of the collar at this point is greater than that of the casing 7 the fluid is prevented from reaching the portion of the plunger 9 which is sliding in the casing 7, thus keeping this portion of the connection clean at all times.

If valve stems with previously inserted valve insides are used I have provided a pin 23 positioned transversely in the tapered end 15 of the plunger 9 so that as the valve stem is seated on the plunger 9 the pin will depress the plunger of the valve inside, thus opening the valve to permit the entrance of the fluid.

Having thus described my invention, I claim:

1. A fluid pressure connection comprising a casing adapted to be mounted in predetermined relation with respect to the valve stem of an article to be inflated, a spring-pressed bored plunger positioned within the casing and adapted to be held in fluid-tight engagement with the valve stem by the pressure in the article acting against the valve stem, and means mounted on the plunger to guide the valve stem into engagement with the plunger, said means being formed to conduct escaping fluid away from the article and plunger and said means having a base portion adapted when the plunger is depressed to engage the casing to limit the downward movement of the plunger.

2. A fluid pressure connection comprising a casing adapted to be mounted in adjustable predetermined relation with respect to the valve stem of an article to be inflated, a spring-pressed bored plunger positioned within the casing and adapted to be held in fluid-tight engagement with the valve stem by the pressure in the article acting against the valve stem, a member secured to the free end of the plunger having its outer end flared inwardly to guide the valve stem into contact with the plunger and slots formed in the walls of said member to conduct escaping fluid away from the article and the plunger, the base of said member overhanging the casing and adapted to engage the latter to limit the downward movement of the plunger.

CHARLES EDGAR MAYNARD.